(12) United States Patent
Chakravarty et al.

(10) Patent No.: US 11,397,458 B2
(45) Date of Patent: *Jul. 26, 2022

(54) BALANCING HIGH ENERGY EVENTS (71) Applicant: Arm Limited, Cambridge (GB)

(72) Inventors: Souvik Chakravarty, Cambridge (GB); Ashley John Crawford, Ashdon (GB)

(73) Assignee: Arm Limited, Cambridge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/126,849

(22) Filed: Dec. 18, 2020

(65) Prior Publication Data

US 2021/0103323 A1   Apr. 8, 2021

Related U.S. Application Data

(63) Continuation-in-part of application No. 16/420,578, filed on May 23, 2019.

(51) Int. Cl.
| | |
|---|---|
| *G06F 1/32* | (2019.01) |
| *G06F 1/324* | (2019.01) |
| *G06F 9/38* | (2018.01) |
| *G06F 1/3206* | (2019.01) |

(52) U.S. Cl.
CPC ............ *G06F 1/324* (2013.01); *G06F 1/3206* (2013.01); *G06F 9/3836* (2013.01)

(58) Field of Classification Search
CPC ..... G06F 1/32; G06F 1/26; G06F 1/28; G06F 9/44; G06F 1/12
See application file for complete search history.

(56) References Cited

U.S. PATENT DOCUMENTS

| | | | | |
|---|---|---|---|---|
| 9,838,025 | B1* | 12/2017 | Deng | ............... H03L 7/1072 |
| 2005/0223251 | A1* | 10/2005 | Liepe | ............... H03K 19/0008 |
| | | | | 713/322 |
| 2012/0120860 | A1 | 5/2012 | Chui | |
| 2014/0157277 | A1* | 6/2014 | Eisen | ................... G06F 1/329 |
| | | | | 718/102 |

(Continued)

OTHER PUBLICATIONS

U.S. Appl. No. 16/420,578, filed May 23, 2019, Garcia-Tobin et al.

(Continued)

*Primary Examiner* — Keshab R Pandey
(74) *Attorney, Agent, or Firm* — Nixon & Vanderhye P.C.

(57) ABSTRACT

A data processing apparatus comprises a plurality of processor circuits to process an event stream comprising one or more high energy events. Each of the plurality of processor circuits draws power from a same power rail. Power management circuitry performs power consumption management by controlling a voltage supply to the power rail, and a frequency of a clock signal provided to the plurality of processor circuits. Status analysis circuitry obtains a status of the individual processing load of each of the processor circuits and restriction circuitry performs high energy event restriction on each of the plurality of processor circuits. The power consumption management and the high energy event restriction are both based on the individual processing load of each of the plurality of processor circuits and each of the processor circuits is restrictable by the restriction circuitry independently of others of the processor circuits.

20 Claims, 8 Drawing Sheets

(56) References Cited

U.S. PATENT DOCUMENTS

| | | |
|---|---|---|
| 2015/0033045 A1* | 1/2015 | Raghuvanshi ........ G06F 1/3243 |
| | | 713/320 |
| 2015/0074431 A1 | 3/2015 | Nguyen |
| 2015/0378412 A1 | 12/2015 | Suryanarayanan |
| 2016/0381621 A1 | 12/2016 | Kim |
| 2017/0063125 A1 | 3/2017 | Jezierski, Jr. |
| 2017/0192476 A1 | 7/2017 | Shaw |
| 2018/0027045 A1 | 1/2018 | Rodrigues |
| 2020/0310509 A1 | 10/2020 | Gendler |

OTHER PUBLICATIONS

Office Action dated Feb. 4, 2021 for U.S. Appl. No. 16/420,578, 20 pages.
Final Office Action dated Jun. 21, 2021 for U.S. Appl. No. 16/420,578, 23 pages.
Advisory Action dated Oct. 5, 2021 for U.S. Appl. No. 16/420,578, 7 pages.
Office Action dated Nov. 12, 2021 for U.S. Appl. No. 16/420,578, 24 pages.

* cited by examiner

4 cores:

| Bitmap | F | V |
|---|---|---|
| 0xffff | 2000 | 1.2 |
| 0x2222 | 2500 | 1.8 |
| 0x2110 | 3000 | 2 |

3 cores:

| Bitmap | F | V |
|---|---|---|
| 0xffff | 2500 | 1.8 |
| 0x222 | 3000 | 2 |

2 cores:

FIG. 8

BALANCING HIGH ENERGY EVENTS

This application is a Continuation-in-Part of U.S. application Ser. No. 16/420,578, filed May 23, 2019, the entire contents of which is hereby incorporated by reference.

TECHNICAL FIELD

The present disclosure relates to power management. For instance, the present techniques could be used in relation to power management of a data processing apparatus with multiple processors.

DESCRIPTION

A data processing apparatus with a number of processor circuits might not have the capability to provide sufficient energy for the entire device to run at full capacity. In particular, high energy events might cause auxiliary circuits to be activated, which consume large amounts of energy. When such events are unregulated and when the processor circuits simultaneously request higher voltages and frequencies, the provided power supply might not be able to keep up. In these situations, it is possible to regulate or restrict the high energy events or to reduce the processor voltage and frequency. However, when all of the processor circuits share a processor clock signal and power rail, the problem becomes more difficult. For instance, if one processor core is processing a large number of high energy events but other cores are not, each processor core might have different requirements for reducing energy consumption. Further complicating this situation is the fact that the number of possible configurations of voltage, frequency, and restriction amount per processor can easily become an enormous space in which to search for a good solution. It can therefore be time consuming and energy intensive to even search for a possible configuration that meets all of the possibly conflicting requirements.

SUMMARY

Viewed from a first example configuration, there is provided a data processing apparatus comprising: a plurality of processor circuits to process an event stream comprising one or more high energy events, wherein each of the plurality of processor circuits is configured to draw power from a same power rail; power management circuitry to perform power consumption management by controlling a voltage supply to the power rail, and a frequency of a clock signal provided to the plurality of processor circuits; status analysis circuitry to obtain a status of the individual processing load of each of the processor circuits; and restriction circuitry to perform high energy event restriction on each of the plurality of processor circuits, wherein the power consumption management and the high energy event restriction are both based on the individual processing load of each of the plurality of processor circuits; and each of the processor circuits is restrictable by the restriction circuitry independently of others of the processor circuits.

Viewed from a second example configuration, there is provided a method comprising: processing, using a plurality of processor circuits, an event stream comprising one or more high energy events, wherein each of the plurality of processor circuits is configured to draw power from a same power rail; performing power consumption management by controlling a voltage supply to the power rail, and a frequency of a clock signal provided to the plurality of processor circuits; obtaining a status of the individual processing load of each of the processor circuits; and performing high energy event restriction on each of the plurality of processor circuits, wherein the power consumption management and the high energy event restriction are both based on the individual processing load of each of the plurality of processor circuits; and each of the processor circuits is restrictable by the restriction circuitry independently of others of the processor circuits.

Viewed from a third example configuration, there is provided a data processing apparatus comprising: means for processing, using a plurality of processor circuits, an event stream comprising one or more high energy events, wherein each of the plurality of processor circuits is configured to draw power from a same power rail; means for performing power consumption management by controlling a voltage supply to the power rail, and a frequency of a clock signal provided to the plurality of processor circuits; means for obtaining a status of the individual processing load of each of the processor circuits; and means for performing high energy event restriction on each of the plurality of processor circuits, wherein the power consumption management and the high energy event restriction are both based on the individual processing load of each of the plurality of processor circuits; and each of the processor circuits is restrictable by the restriction circuitry independently of others of the processor circuits.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Before discussing the embodiments with reference to the accompanying figures, the following description of embodiments is provided.

In accordance with one example configuration there is provided a data processing apparatus comprising: a plurality of processor circuits to process an event stream comprising one or more high energy events, wherein each of the plurality of processor circuits is configured to draw power from a same power rail; power management circuitry to perform power consumption management by controlling a voltage supply to the power rail, and a frequency of a clock signal provided to the plurality of processor circuits; status analysis circuitry to obtain a status of the individual processing load of each of the processor circuits; and restriction circuitry to perform high energy event restriction on each of the plurality of processor circuits, wherein the power consumption management and the high energy event restriction are both based on the individual processing load of each of the plurality of processor circuits; and each of the processor circuits is restrictable by the restriction circuitry independently of others of the processor circuits.

The event stream contains a number of high energy events (HEEs) that use significantly more energy than low energy events. Such high energy events could, for instance, involve the activation of additional circuitry (beyond that of regular instructions) that therefore increases energy consumption or could involve the prolonged use of circuitry that causes average energy usage to significantly increase. These high energy events might come in bursts through the event stream. The data processing apparatus includes a number of processor circuits (e.g. processor cores) that share a common power rail. One or more of these processor circuits process the high energy events. In addition, the same clock signal is sent to the processor circuits so that the voltage and frequency sent to the processor circuits is the same. In such a scenario, there are two different ways in which energy consumption can be reduced. One is to lower the frequency/voltage supplied to the processor circuits. However, this in turn reduces the clock speed at which the processor circuits operate at and means that instructions execute more slowly. Another option (which can be taken in combination) is to affect (e.g. throttle) the rate at which the high energy events are processed. However, this has the consequence that it will take longer to clear the set of high energy events in the stream. In a similar way, if energy is consumed to increase the voltage/frequency then that energy cannot also be spent in processing the high energy events more quickly. Thus, a tradeoff must be considered. This matter is complicated by the fact that the processor circuits share a rail and clock frequency. Thus, an adjustment to voltage/frequency affects all of the processor circuits. The workload that is considered includes not only the HEEs but also non-HEEs (as might occur from management system requests for increased clock frequency).

In some embodiments, the power management circuitry is incapable of supplying both a maximum requested voltage supply and a maximum requested clock signal to all of the plurality of processor circuits simultaneously in the absence of the high energy event restriction. For example, the current delivery is limited and cannot be provided to all of the processor circuits simultaneously—this being controlled by adjusting the voltage/frequency. In these embodiments, the processing circuits may be capable of operating at a number of different voltages and clock signals. However, it is not possible in these examples to provide both the maximum voltage supply and the maximum clock frequency/signal that can be demanded to all of the processor circuits at the same time when no restrictions are placed on the processing of high energy events due to the current that this would require. That is, it is not possible for all of the processor circuits to simultaneously operate at a maximum voltage, frequency, and high energy event execution at the same time. It is a common scenario in data processing apparatuses where the energy supply may not be adequate for each of the operating circuits to operate at full capacity—either at all or for a period of time. In these examples, some kind of throttling (either the throttling of the high energy events or reduction of the processor voltage/frequency) is performed. Consequently, the energy needs can be met by the energy supply.

In some examples, a distribution of the high energy events is unequal across the plurality of processor circuits; and the status of the individual processing load of each of the plurality of processor circuits comprises the distribution of the high energy events across the plurality of processor circuits. In these examples, the event stream contains a number of high energy events in dispersed between low energy events. The act of considering the status of the individual processing load of each of the processor circuits involves considering the distribution of the high energy events across the plurality of processor circuits.

In some examples, at least one of the status analysis circuitry and the restriction circuitry is configured to reassess at least one of the voltage supply, the frequency of the clock signal, and the high energy event restriction each period; and during the period, one of the plurality of processor circuits receives more of the high energy events than all others of the plurality of processor circuits combined. There are a number of ways in which the energy events can be distributed unequally. However, in these examples, a period is defined during which one of the processor circuits receives more of the high energy events than all of the other processor circuits combined. The period in question can be defined as a period before which power management and high energy event restriction is reconsidered. In such situations, the selection of energy configuration becomes complicated since enabling the high energy event loaded processor circuit to process the high energy events quickly could require a reduction in processor voltage/frequency, which would affect the voltage/frequency of the other processor circuits.

In some examples, the data processing apparatus comprises: storage circuitry to store a plurality of configuration tuples, wherein each configuration tuple comprises a specified frequency, a specified voltage, and a specified restriction amount, wherein the power management circuitry is configured to select the specified frequency from one of the configuration tuples as the frequency of the clock signal, and to select the specified voltage from the one of the configuration tuples as the voltage supply to the power rail; and the restriction circuitry is configured to select the specified restriction amount from the one of the configuration tuples as the amount of the high energy event restriction to be performed. Each configuration tuple provides a separate specified frequency, voltage, and high energy event restriction amount.

In some examples, the specified restriction amount indicates an extent to which restriction of the high energy events occurs for each of the processor circuits individually. In these embodiments, each configuration tuple specifies a separate restriction for each of the processor circuits in processing high energy events. For instance, for all of the processor circuits sharing a power rail, one of the processor circuits may be restricted in processing high energy events more heavily than another processor circuit.

In some examples, each combination of possible restriction amounts for the processor circuits is provided at most once in the storage circuitry. Storage circuitry could contain a large number of such tuples. However, it will be appreciated that as the number of tuples in the storage circuitry increases, the storage capacity of the storage circuitry increases and therefore its power consumption also increases. Furthermore, space used by the storage circuitry will also increase and the processing effort required to make use of the stored information increases. However different permutations of each combination are not included. Therefore, each combination of possible high energy event restriction amounts across the processor circuits is provided at most once on the storage circuitry. This recognises the fact that, in general, (e.g. where the processor circuits are homogeneous), precisely which processor circuit is given which restriction amount is irrelevant to the question of the overall energy consumption limit. As a consequence, not all permutations need to be included in the storage circuitry and so the storage requirements of the storage circuitry can be reduced as compared to a situation where all permutations are stored as separate tuples. This reduces circuit size, power consumption, and improves the speed with which a configuration tuple can be selected.

In some examples, a number of the configuration tuples stored in the storage circuitry corresponds with a number of possible frequencies at which the processor circuits can operate. The inventors have recognised that, for each possible frequency at which the processor circuits can operate, there is generally one optimal or at least appropriate combination of high energy event restriction for each of the processor circuits. Other combinations of high energy event restriction are excluded in these embodiments therefore making it possible to further reduce the storage requirements of the storage circuitry. In particular, it will be appreciated that if a particular clock frequency/voltage is to be achieved, there is usually little value in being unnecessarily restrictive in the processing of high energy events (and vice versa). Consequently, including sub-optimal solutions has little benefit. Note that in some examples, this number can be either further restricted by excluding a subset of the possible processor frequencies that can be achieved by the processor circuit. For instance, frequencies that are excessively low and would result in unacceptably degraded performance could be removed. Similarly, since the energy required for increased processor frequencies is non-linear, there are diminishing returns for increasing the processor frequencies. The very highest frequencies could therefore be excluded from configurations.

In some examples, the storage circuitry stores multiple sets of the configuration tuples for different numbers of active ones of the processor circuits. In this way, the energy budget can be spent differently depending on a number of active processor circuits so that if processor circuits are deactivated, the energy that goes unused by those deactivated processor circuits can be spent on the active processors.

In some examples, the high energy event restriction for each processor circuit is initially determined based on a count of the high energy events on that processor circuit. Although there are a number of ways of determining the extent to which high energy event restriction should occur on each processor circuit, these embodiments use, as a starting point, a count of the high energy events on each processor circuit. This could be determined, for instance, within a previous window of time. For instance, if high energy event throttling has been occurring to a large extent, it could be concluded that the throttling should be decreased in order to cause the high energy events to be cleared. Similarly, if high energy throttling is not occurring then this suggests that the number of high energy events being provided to the processor circuit is very small thereby making it possible to increase the restrictions without a detrimental effect on the processor circuit. The count could, for instance, be a count of the number of windows of time for which the number of high energy events has exceeded a particular number. In some examples, the count indicates how many windows of time the number of high energy events has exceeded different numbers.

In some examples, the high energy event restriction for each processor circuit is modified according to a request from a management system for that processor circuit. Management system can request a change the processing capabilities of a processor circuit. A request for a change in the processing capabilities of the hardware could occur where a burst of activity is required, e.g. if urgent processing is to be performed. Such a management system could take the form of an operating system, for instance, that executes on the processor circuit. In other examples, the management system could include a hardware unit that is capable of detecting the load of what is executing on the processor circuit. In these examples, the request from such a management system could be taken into account when determining the extent to which high energy events are to be restricted on the processor circuit.

In some examples, the request is for an increase in the frequency of the clock signal. Typically a management system would require an increase in clock frequency in order to process instructions more quickly. Such frequencies are usually not maintained due to the high levels of power required and heat generated. Thus, management systems, such as operating systems, tend to request boosts in order to more quickly process urgent instructions.

In some examples, in response to the request being a request for an increase in the frequency of the clock signal when a further condition is met, the frequency of the clock signal is reduced. In these examples, the management system requests an increase in the frequency of the clock signal. This could occur as a consequence of the management system requiring a higher clock frequency signal to quickly process a large number of instructions. In this situation, when a further condition is met, the frequency of the clock signal is actually reduced. That is, contrary to the request of the management system, the clock signal is not increased but is decreased, thereby causing the level at which instructions can be processed to be reduced and reducing the energy consumption. In some of these examples, the further condition is that the request is received from a highest energy event loaded processor circuit out of the processor circuits that share the power rail. In some of those examples, the further condition could also include the requirement that of all the processor circuits requesting a change in the frequency of the clock signal, this processor circuit is the one requesting the highest clock frequency. In either case, this scenario recognises that in such a situation, the workload on the processor having the highest high power event loading is likely to have a more important workload than other processor circuits, with that workload also being high energy event intensive. In this situation, the management system may react by demanding an increase in the clock signal in order to clear the high energy events. In current embodiments, since it is known that the processor circuit is also inundated with high energy events, it is appropriate to instead reduce the frequency of the clock signal. This makes it possible to decrease the throttling of high energy events, therefore allowing the high energy events to clear more quickly (despite the reduction in clock frequency). Thus, in this situation, although the management system requests an increase in the clock signal, the processor circuit is actually better served by reducing the clock signal and using the energy budget to instead reduce throttling of the high energy events. It will be appreciated, that in some situations, there may be several highest high energy event loaded processor circuits. In these situations, if each of those processor circuits demands an increase in the frequency of the clock signal, the frequency of the clock signal is reduced and the high energy event restrictions on those processor circuits is lessened.

In some examples, the voltage supply to be supplied to the power rail and the frequency of the clock signal provided to the plurality of processor circuits is determined based on the high energy event restriction for each processor circuit. Thus, in these examples, the selection of frequency and voltage is dictated by the high energy event restriction amount that has been determined for each of the processor circuits. Having determined the extent to which high energy events are to be restricted, the configuration tuples stored in storage circuitry are consulted in order to determine the highest frequency/voltage that can be achieved using those restrictions.

In some embodiments, the high energy event stream comprises a high energy instruction stream; and the one or more high energy events comprises one or more high energy instructions. The HEEs could therefore be caused by particular instructions being executed by the processing circuitry. Another example of HEEs could include data cache activity such as hardware prefetches.

In some embodiments the one or more high energy events consume more power than an average power consumption of other events in the event stream. There are a number of ways of defining HEEs. However, in these embodiments, HEEs are defined as being those events that consume more energy than an average power consumption of all events. In some embodiments, rather than comparing to an average, the HEEs may include, from among all events processed by a processing circuit, the top x % of energy consuming events. In some other embodiments, HEEs are defined as being events that are greater (by some margin such as 25% or 50% or 100%) than the average power consumption of all events.

In some embodiments, the one or more high energy events comprise a subset of instruction types. Such instruction types could be selected by an architect of the data processing apparatus to encompass particular categories of instruction that are known to be heavy energy consumers as compared to other types of instruction. For example, in some embodiments, the subset of instruction types comprises vector instructions while excluding at least some scalar instructions. Vector instructions are instructions in which a single operation is performed on a large number of data values simultaneously. This can be achieved by providing a plurality of processing circuits and by passing each data value to its own processing circuit, with the same instruction (or control signal) being passed to each processing circuit to perform the same operation on each of the data values. This is referred to as Single Instruction Multiple Data (SIMD) parallelism. Due to the large number of processing circuits, which operate in parallel, the energy consumed in executing such instructions is often significantly higher than for non-vector (scalar) instructions in which perhaps only a single one of the processing circuits is active. Furthermore, the energy can be consumed in a short period of time, leading to high power consumption. One example of a vector Instruction is a scalable vector instruction, in which the number of data values provided by instructions can vary between instructions. Another instruction type that can be considered to be a high energy event is a wide memory load/store in which a large amount of data is loaded from or stored to a memory device.

Particular embodiments will now be described with reference to the figures.

Figure 1:
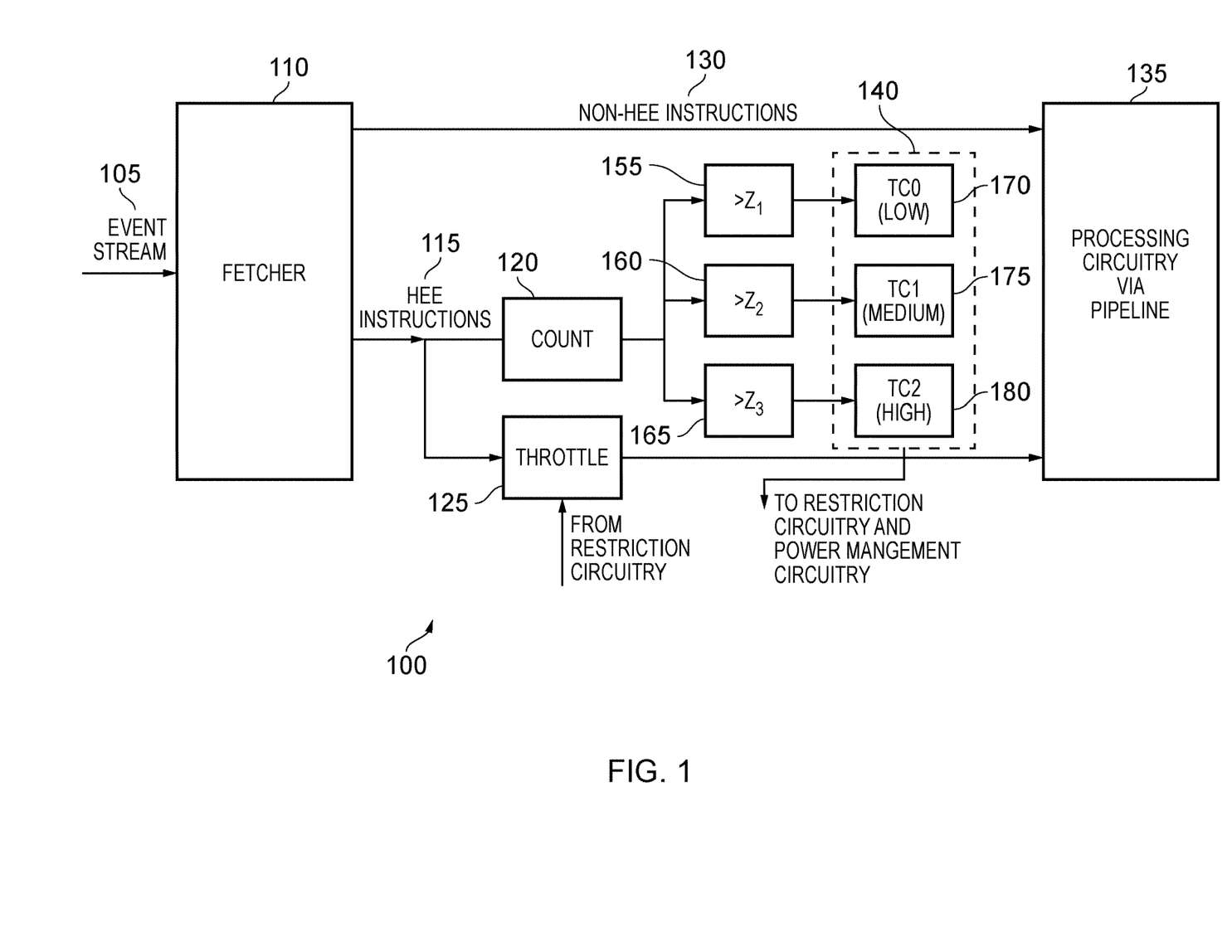
FIG. 1 schematically illustrates a processor core as might be used in some embodiments.

FIG. 1 schematically illustrates a processor core 100, which is an example of the claimed processor circuit. The processor core 100 receives an event stream 105 which could take the form of a stream of instructions. The stream of instructions is fetched from an instruction cache or main memory by a fetcher 110. In this example, the fetcher 110 divides the instructions into two portions based on their type—HEE or non-HEE. There are a number of ways in which such categorisation can take place, but in these embodiments, vector instructions are considered to be HEEs while scalar instructions are considered to be non-HEEs. Other embodiments might consider HEEs to include instructions that involve the activation of circuitry that is high in energy consumption such as those that use wide data lanes or vector instructions. The determination of whether an instruction corresponds with a HEE or not will obviously depend on how the HEEs are defined, but could be achieved by analysis of the instruction opcode.

The non-HEE instructions 130 are passed, via a pipeline, to a processing circuitry 135 where the instructions are executed.

The HEE instructions 115 are passed to both a throttle 125 and a counter 120. The throttle controls the rate at which HEE instructions 115 are passed on to the processing circuitry via the pipeline 135. This makes it possible to slow down the rate at which HEE instructions 115 are processed, or to extend their execution across a number of processor cycles. The counter 120 counts the number of HEE instructions 115 that are received within a micro-interval (a plurality of ticks of a clock signal provided to the data processing apparatus 100). This updated count 120 is then compared via a number of comparators 155, 160, 165 to thresholds Z1, Z2, Z3. In some embodiments, the counters could be weighted by different amounts depending on the event in question.

Each of the comparators 155, 160, 165 compares the current count value 120 to one of the thresholds Z1, Z2, Z3 and increases a corresponding counter value 170, 175, 180 if the comparison indicates that the current count is higher. The counters 170, 175, 180 are therefore indicative of the number of micro-intervals for which each of the thresholds Z1, Z2, Z3 is exceeded in the current macro-interval. The thresholds differ from each other so that one can determine the level of HEEs. The counters can be considered to be an example of part of the claimed status analysis circuitry for a single processor circuit/core.

Each of the values in counters 170, 175, 180 is considered and on the basis of these values, causes power management to occur. In particular, a change in the voltage or clock frequency supplied to the processor core 100 could be made. In addition, the throttle 125 makes it possible to limit the extent to which HEE instructions 115 are executed based on a signal from restriction circuitry. In this way, based on the number of HEE instructions that are encountered, voltage, frequency, and throttling of the HEE instructions can be controlled in order to achieve an overall high throughput of instruction execution while limiting power consumption of the data processing apparatus 100.

In some other embodiments, rather than using entirely hardware comparisons, the counters can be read by a firmware element and the power management may be enacted by that element.

Figure 2:
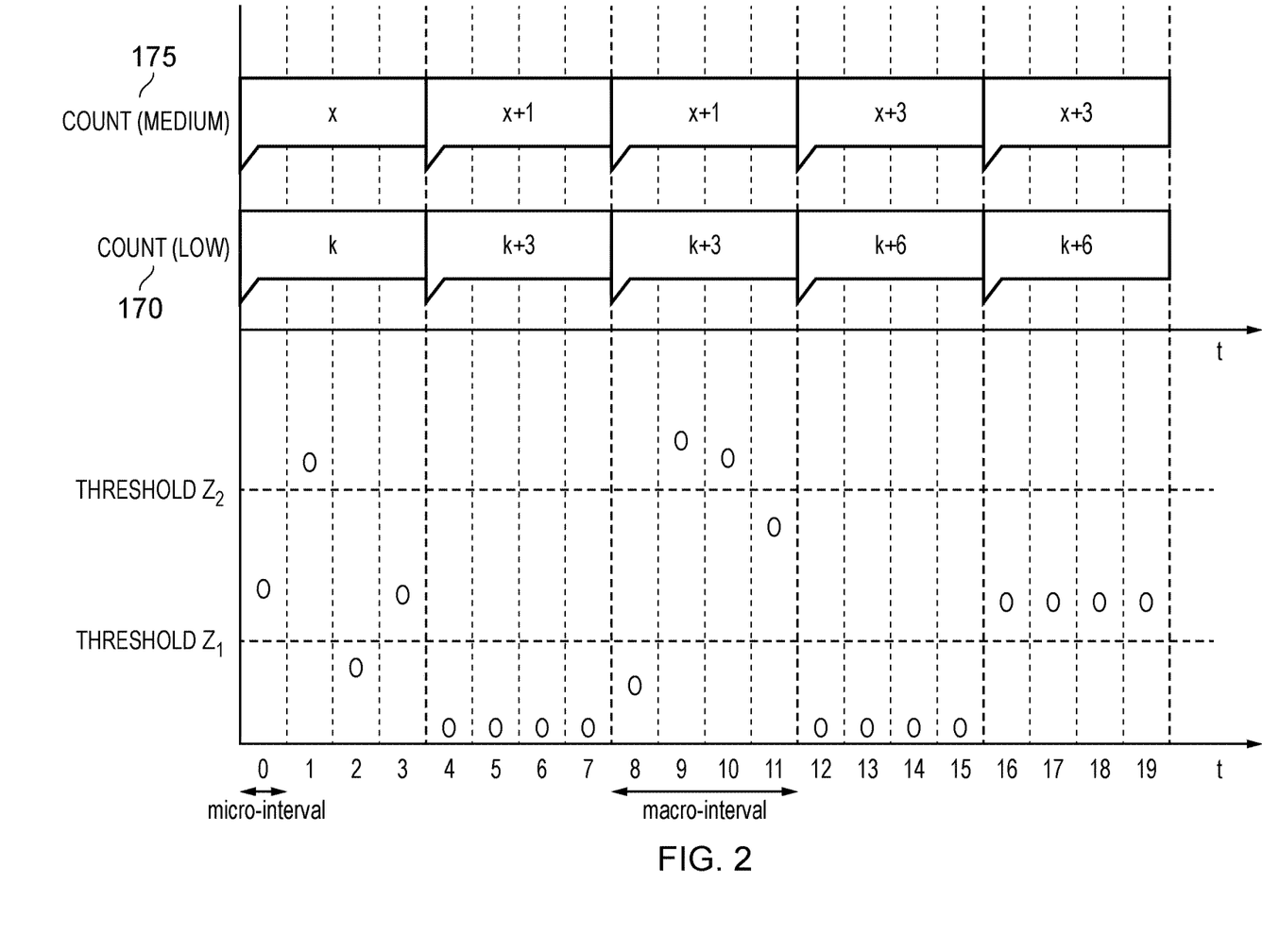
FIG. 2 illustrates the relationship between micro intervals and macro intervals, that indicate how counters for high energy events can be incremented.

FIG. 2 illustrates the relationship between micro-intervals and macro-intervals and how the counters 170, 175, 180 are incremented. In this example, the number of micro-intervals in which the Z1 threshold is met is stored by a first low counter TC0 170, and the number of micro-intervals for which the Z2 threshold is met is counted by a medium counter TC1 175. The initial value of the low counter TC0

170 is k, while the initial value of the medium counter TC1 175 is x. In this example, each macro-interval is made up of four micro-intervals. From a review of FIG. 2, it will be noted that during the first macro-interval, there are three micro-intervals in which the number of HPE instructions exceeds Z1. These micro-intervals are numbered as 0, 1, and 3. Accordingly, at a next macro-interval, the value of the low counter 170 has increased from k to k+3. During the same first macro-interval, there is one micro-interval in which the number of HPE instructions exceeds Z2. This is the micro-interval numbered as 1. Accordingly, at a next macro-interval, the value of the medium counter 175 has increased from x to x+1. During the second macro-interval, there are no micro-intervals in which either Z1 or the Z2 are exceeded. Consequently, the values of the low counter 170 and the medium counter 175 in the following macro-interval remain as k+3 and x+1 respectively. During the third macro-interval, there are three micro-intervals, (9, 10, and 11) during which Z1 is exceeded, and there are two micro-intervals (9 and 10) in which Z2 is exceeded. Consequently, during the fourth macro-interval, the low counter 170 is increased from k+3 to k+6 and the medium counter 175 is increased from x+1 to x+3. During the fourth macro-interval, there are again no micro-intervals in which the number of HPE instructions exceeds Z1 or Z2, and consequently during the fifth macro-interval, the value of the low counter 170 and the medium counter 175 remain the same. During the fifth macro-interval, there are four micro-intervals (16, 17, 18 and 19), during which the number of HPEs exceeds Z1. There are no micro-intervals in which Z2 is exceeded. Consequently, although not shown in FIG. 3, the value of the low counter 170 for the following macro-interval would increase from k+6 to k+10. Meanwhile, the value of the medium counter 175 would remain at x+3.

Figure 3:
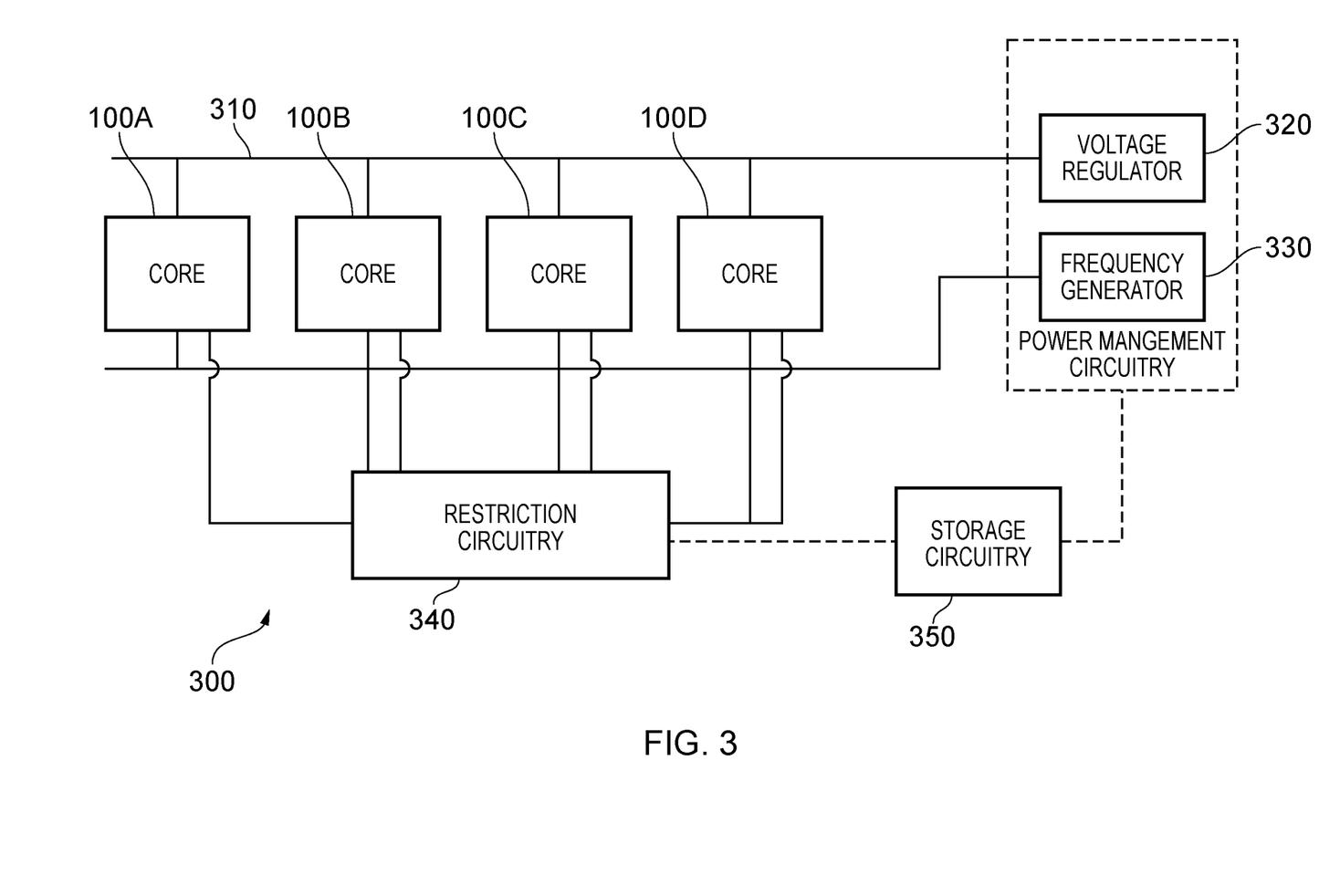
FIG. 3 schematically illustrates a data processing apparatus according to some embodiments.

FIG. 3 illustrates a data processing apparatus in accordance with some embodiments. In these embodiments, a number of processor cores 100A, 100B, 100C, 100D each share a power rail 310, which is controlled by a voltage regulator 320. Each of the cores 100A, 100B, 100C, 100D also receives a same clock signal produced by a frequency generator 330. In this way, the clock speed and the voltage of each of the cores 100A, 100B, 100C, 100D is the same. Restriction circuitry 340 makes it possible to provide a restriction signal to the throttle circuitry 125 of each processor core individually such that the extent to which HEEs are restricted on each core can be controlled separately. This makes it possible to heavily restrict some of the cores which not restricting other cores, for instance. Storage circuitry 350 is provided in order to store a number of 'configuration tuples'. Each tuple indicates a configuration of voltage and frequency for the cores 100B, 100C, 100D as well as individual restriction amounts for the processing of HEEs for each of the cores 100A, 100B, 100C, 100D.

In this example, the decision regarding the voltage and frequency to use, as well as the amount with which to restrict the HEEs is dependent on the information obtained from the counters 140 on each of the processor cores. That is to say that the frequency and voltage given to all of the cores, as well as the HEE restrictions given to each processor core 100A, 100B, 100C, 100D is dependent on the status of all of the cores 100A, 100B, 100C, 100D. This creates some difficulties, since each of the cores 100A, 100B, 100C, 1100D might have different considerations. For instance, if one of the cores has a large number of HEEs, it might desire a low restriction rate of HEEs so that it can process them more quickly. However, this will consume energy, which in turn could require all of the cores 100A, 100B, 100C, 100D to operate at a lower frequency and voltage. This will cause the other cores to operate more slowly, which might also be undesirable. Further complicating the issue is the fact that there could be a vast number of different combinations of restriction amounts, voltages, and frequencies. Checking each possibility to find ideal (or even good) solutions can be very time consuming. This itself can result in high energy expenditure and could require significant circuitry to resolve. The remaining figures, described below, illustrate a process that can be used in order to find a suitable 'middle ground' quickly.

Figure 4A:
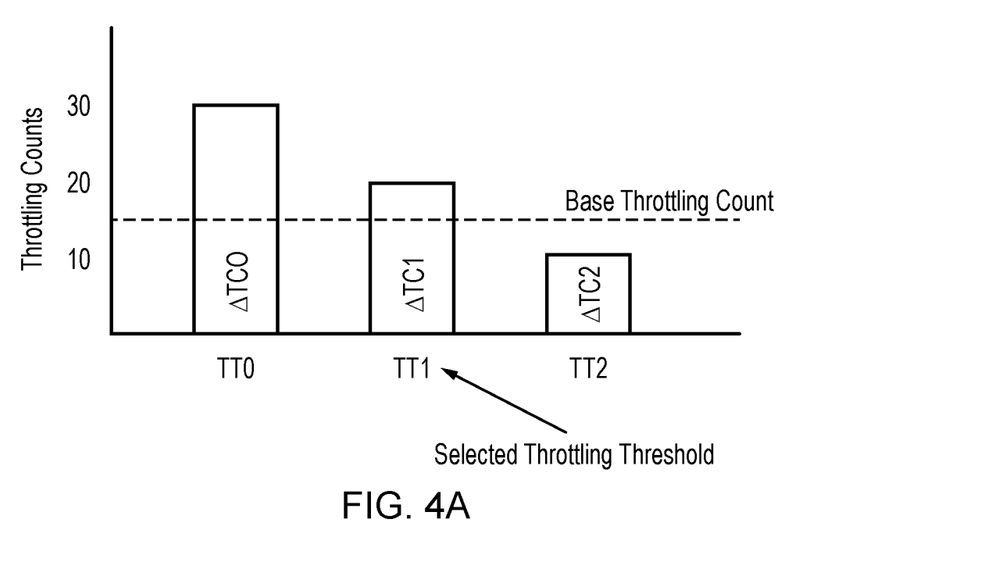
FIGS. 4A and 4B provide examples of how a first throttling threshold/restriction can be established.
Figure 4B:
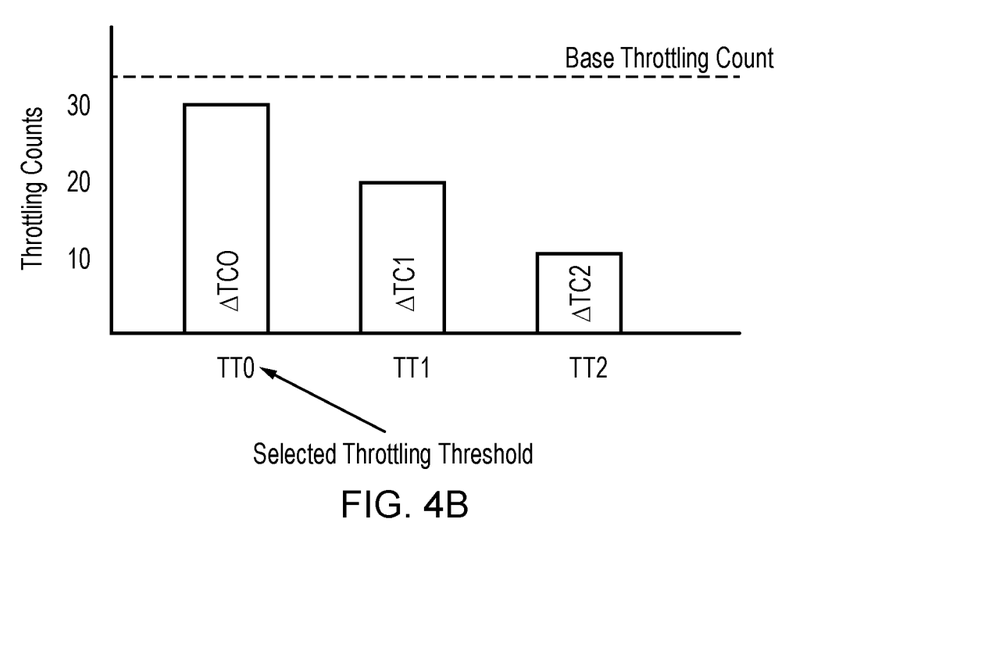

The process described here is a three step process.
1. Determine a base restriction amount for each of the processor cores/circuits
2. Make adjustments depending on requests from any management systems (such as operating systems) for each of the processor cores/circuits
3. Select a suitable configuration from the configuration tuples that indicates a given frequency, voltage, and restriction amount FIGS. 4A and 4B show examples of determining base restriction amounts for each of the processor cores. The process considers a Base Throttling Count (BTC), which is a system defined bias towards higher or lower throttling of HEEs. In effect, this value indicates whether throttling of HEEs should be preferred or avoided and so can be set by the system designer (or the user) depending on the nature of the work being performed by the processor cores. If HEEs are non-critical and/or rare then high throttling might be desired resulting in a high BTC. If HEEs are critical and/or common then throttling might not be desirable, and so the BTC can be set low.

In FIG. 4A, the BTC is set at 15, which in this example indicates a slight tendency or desire to throttle. The process considers the changes in the values of each of the counters 170, 175, 180 since the last time a throttling level decision was made. Each of the counters has an associated restriction amount (throttling threshold) associated with it. The throttling threshold is a threshold at which throttling of HEEs will occur.

Higher counters (e.g. TC2 rather than TC1 or TC0) indicate a number of micro-intervals in which the number of HEEs was above a higher number. That is, while TC1 counts the number of micro-intervals in which the number of HEEs was above X, TC2 counts the number of micro-intervals in which the number of HEEs was above X+K (where X and K are both positive integers and K is greater than 0). Higher counters generally have a higher throttling threshold associated with them so that a high number of the HEEs occur within a micro interval before throttling is applied. This means that, in the presence of a large number of HEEs, throttling is limited so that the HEEs can be cleared quickly.

The selection process orders the counters (e.g. in descending order) and then considers the counter whose value is just greater than the BTC (i.e. the nearest highest value). The throttling threshold associated with this counter is selected for the processing circuit. In the case of FIG. 4A, the closest highest counter to the TBC is TC1. Therefore, the corresponding restriction amount/throttling threshold TT1 is selected for that processor circuit, which would be expected to be a moderate level of throttling.

In the example of FIG. 4B, the BTC is set to a high value of (in this case) 35, indicating a strong tendency or desire to throttle. Here, there is no counter delta having a larger value than the BTC. Consequently, the closest counter is selected (TC0). The throttling threshold it refers to (TT0) is used. A low threshold at which throttling or restriction occurs (i.e. a high restriction amount) is therefore applied.

In situations where all of the counters is zero, a default throttling threshold is selected as, for instance, a low throttling threshold. In other situations, such a decision could be left to a management system such as an operating system.

In this way, a base throttling count can be determined for each processor. At this stage, the process considers only the workload of the processor itself for which the throttling threshold is considered. Each processor is therefore capable of providing input as to the level of throttling threshold that should be applied.

Figure 5:
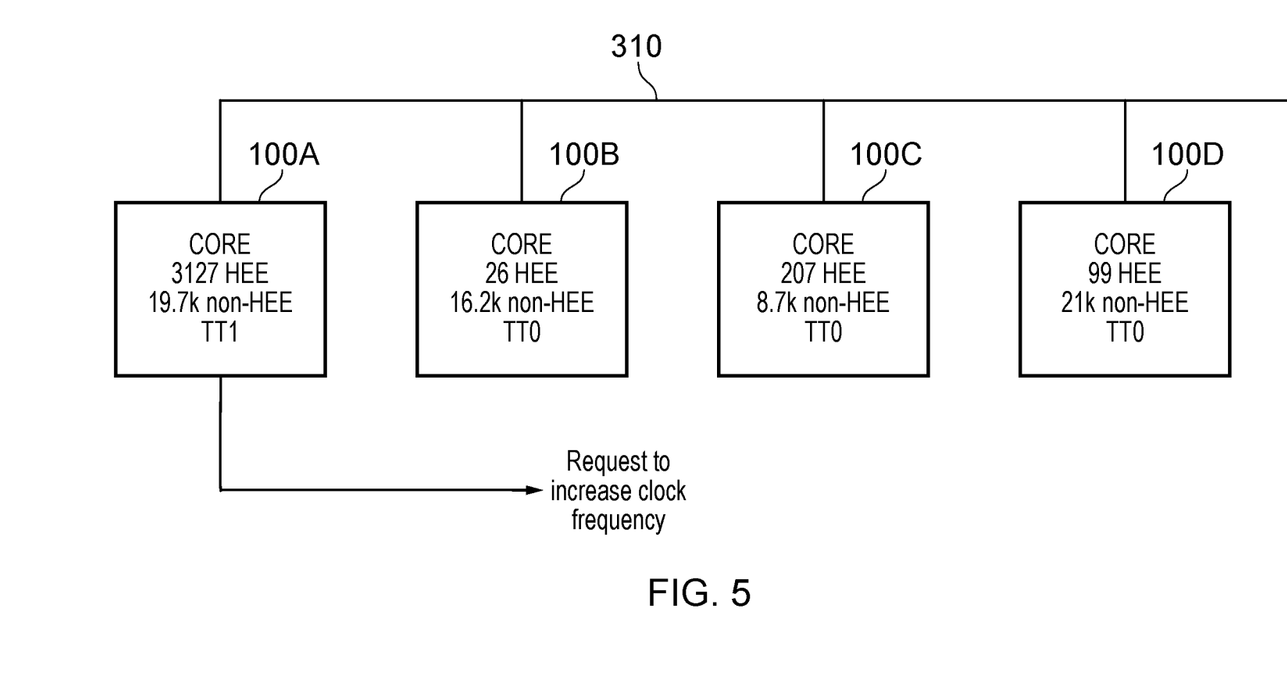
FIG. 5 shows how requests from a management system such an operating system can influence the selected throttling threshold.

FIG. 5 illustrates the process with respect to the second step of considering a request from a management system. A management system, which could take the form of an operating system or a hardware unit that performs similar functionality to an operating system for instance, could request an increase in the clock frequency as a consequence of the workload on the processor core that the management system is managing. Typically this occurs when the processor circuitry has a large amount of work to process and a faster clock frequency is required in order to get through the work. In response to the request from the management system, one of two things can happens:

If the request originates from a processor core that has a (joint) highest throttling threshold (restriction amount) among the throttling thresholds selected for all of the cores 100A, 100B, 100C, 100D then this suggests that the workload is both HEE intense and of high importance as compared to the other cores. If the requested clock frequency for that processor core is higher than all of the other requested clock frequencies then the throttling threshold for that core is increased so that more HEEs can be processed in a shorter space of time. That condition is met in the example of FIG. 5, where the throttling threshold (TT1) for the core 100A making the request is higher than the throttling threshold (TT0) of the other cores 100B, 100C, 100D. Typically, this will result in the frequency/voltage being decreased—contrary to the request of the management system. In should be appreciated however that the request from the management system to increase the clock frequency is not specifically a request for the clock frequency to be increased but rather a demand for help to clear the current workload. The present examples recognise that, in this situation, it is more efficient to lower the frequency/voltage and therefore reduce the throttling of HEEs rather than increasing the frequency and causing the HEEs to execute more slowly. Indeed in this example, the core 100A that requests a higher clock frequency has more HEEs than all of the other cores 100B, 100C, 100D combined. An increase to the clock frequency is unlikely to be as effective in clearing the workload of this core 100A than a reduction in HEE processing restrictions.

Where the request does not originate from a processor core with a (joint) highest throttling threshold among the throttling thresholds selected for all of the cores 100A, 100B, 100C, 100D or where the request does originate from such a processor core but management systems of other processor cores are requesting higher clock frequencies then it is interpreted that the priority of the HEEs on the core are not very high. Consequently, contrary to the above example, the throttling threshold/restriction amount remains the same and the clock frequency is not increased.

The above process is performed for each of the processor cores.

Figure 6:
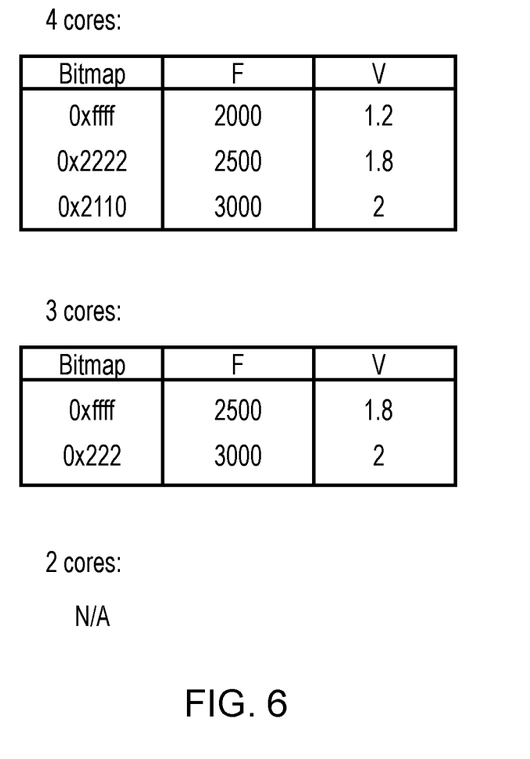
FIG. 6 gives an example of different configuration tuples.

FIG. 6 then illustrates the third step, which is to select a configuration tuple according to the specified throttling thresholds for each of the processor cores. Whereas the previous steps are performed on a per-core basis, the third step takes all of the processor cores into account. Firstly, the throttling thresholds are arranged in numerical order. This could be ascending or descending order, but the example described here assumes that they are sorted in descending order. Thus, if the throttling thresholds given by the processor cores are '1', '4', '3', '3', then the revised ordering is 4331. The identity of precisely which core is assigned which throttling threshold is unimportant for this step. The configuration tuples stored in the storage circuitry 350 are then searched for an appropriate match. Each tuple features an associated bitmap, which represents the set of throttling thresholds, together with a performance level that represents a processor frequency/voltage. The search is carried out using the revised ordering. If an exact match occurs with one of the bitmaps occurs then the specified frequency/voltage are selected. Otherwise, the next lowest entry is used.

Note that since the throttling thresholds are arranged in a particular order, permutations of the throttling thresholds are not considered. Using the above example, no entry is provided for the bitmaps 3314 or 1334 because these are permutations of the valid entry 4331. This is done in order to reduce the number of tuples that are to be stored in the storage circuitry 350. The permuting of precisely which processor core is assigned each restriction amount can be determined once the configuration has been decided.

Another thing to note that is that in many embodiments, only one bitmap is provided for each allowable clock frequency/voltage. This is because, for a given frequency/voltage, a specific amount of HEE restriction for the processor cores exists (usually the ideal amount). Other restriction amounts would simply result in unnecessary processor restriction and so need not be considered.

A different set of configuration tuples can be provided for each number of processor cores that are active. If one of the processor cores is deactivated, for instance, then more energy is available for other processor cores to use and so different tuples may be required.

FIG. 6 illustrates an example set of tuples for four active cores and for three active cores. Where there are four active cores and the specified throttling thresholds (in descending order) are '2222' there is an exact match and so the processor frequency is set to 2500 Hz (2.5 GHz) with a voltage of 1.8V. If the specified throttling thresholds was '2221' then no entry exists and so the next lowest threshold is taken as '2110'. This uses a frequency of 3000 Hz (3.0 GHz) and a voltage of 2V.

FIG. 6 also shows tuples for when three of the four cores is active. Here, the same energy budget is spread across a small number of cores, allowing each core to expend a greater amount of energy. Hence, for a similar throttling threshold of '222', a frequency of 3000 Hz (3.0 GHz) can be achieved with a voltage of 2V.

For two or fewer cores active, no tuples are provided. In this example, this means that the cores can run with a maximum frequency, voltage and with no throttling of HEEs. In other words, the energy saved from the deactivation of two cores is so great that further limitations need not be applied.

Note that by including one configuration for each 'allowable' frequency and by not including permutations, the number of entries can be substantially reduced. Without these limitations, the number of possible configurations could be enormous. For instance, with 120 cores and four different restriction levels and six different voltage/frequency options, the number of possible permutations of energy configuration would be of the order of $4^{120} \times 6$. In the current example, only six different entries are required.

Figure 7:
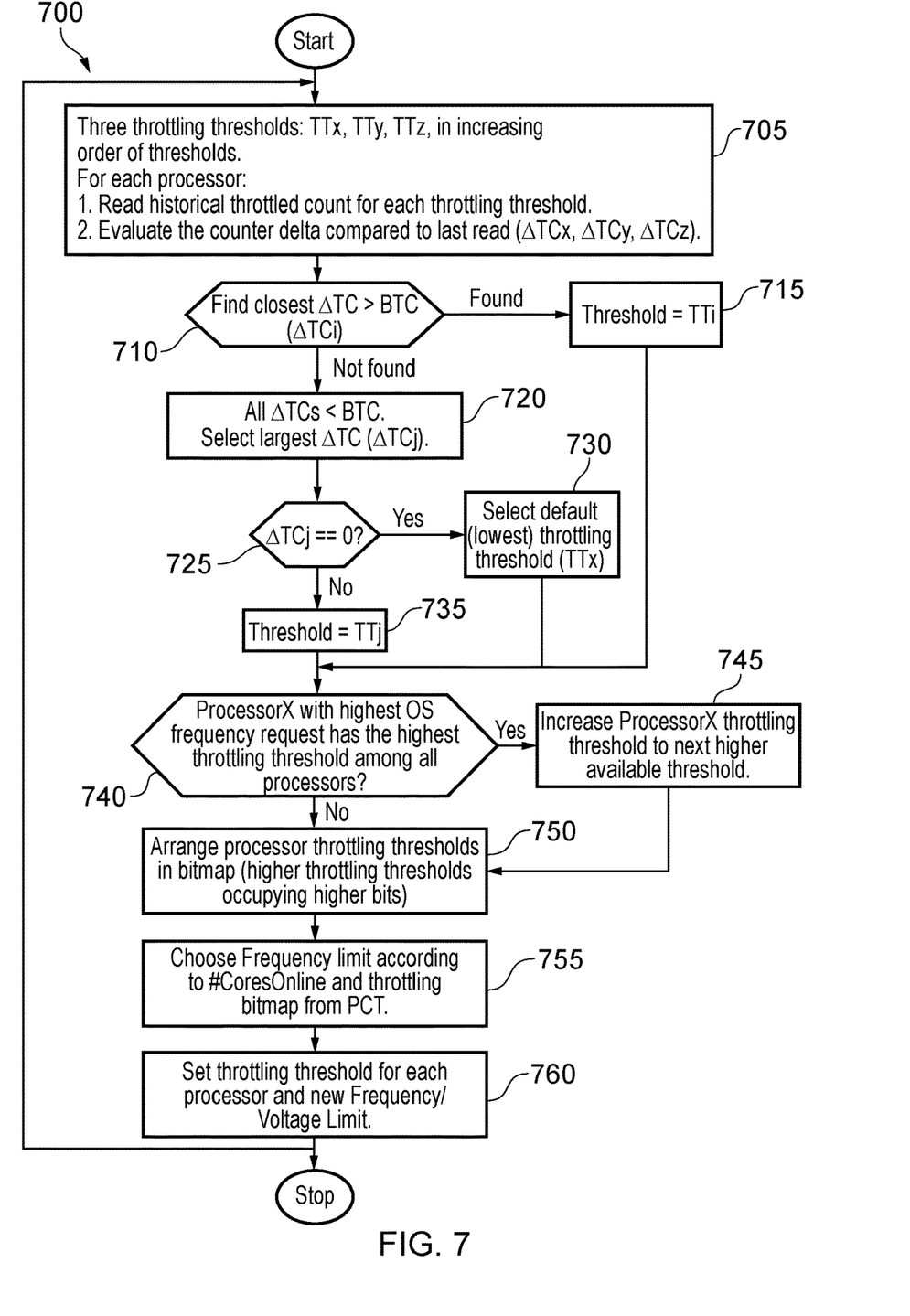
FIG. 7 shows a flowchart that illustrates how a configuration can be selected for a data processing apparatus in accordance with some embodiments.

FIG. 7 illustrates the decision making process in the form of a flowchart 700. At a step 705, the throttling thresholds are arranged in increasing order. Then, for each processor, the threshold counter deltas are calculated (e.g. the counter value difference since a decision was last made regarding the power configuration). At a step 710, the closest delta value to the BTC that is above the BTC is determined. If this is found then at step 715 the threshold that is found is selected for the processor core and the process proceeds to step 740. Otherwise, at step 720 all of the threshold counters are less than the BTC so the lowest throttling threshold is taken. If, at step 725, the threshold counter is equal to 0 then at step 730 the default (e.g. lowest) throttling threshold is taken. Otherwise at step 735, the threshold is taken as the throttling threshold associated with the counter having the highest value.

At step 740, it is determined whether the processor core that has the highest throttling threshold is also the processor core that is making the highest processor frequency request. If so, then at step 745, the throttling threshold is increased to the next highest level (e.g. TT1 goes to TT2—thereby reducing restrictions on HEEs) and the process proceeds to step 750. At step 750, the throttling thresholds are arranged in descending order as a bitmap. At a step 755, the frequency limit is selected according to the bitmap and the number of cores online. Finally, at a step 760, the throttling thresholds, voltages, and frequencies are applied. Typically, the processor that requested the highest throttling threshold is assigned the highest threshold from the calculated configuration and the processor that requested the second highest throttling threshold is assigned the second highest threshold from the calculated configuration, and so on.

This process is repeated periodically, e.g. each macro interval or set of macro intervals.

The above examples illustrate how it is possible to assign a throttling threshold, frequency and voltage to each of the processor cores that share a clock frequency signal and power rail. The described process is efficient in that rather than storing a vast number of possible configurations, only those configurations that are practical are actually stored and checked. In addition, the described process is able to take operating system requests into account while also balancing the needs of multiple processor cores with potentially conflicting requirements.

Figure 8:
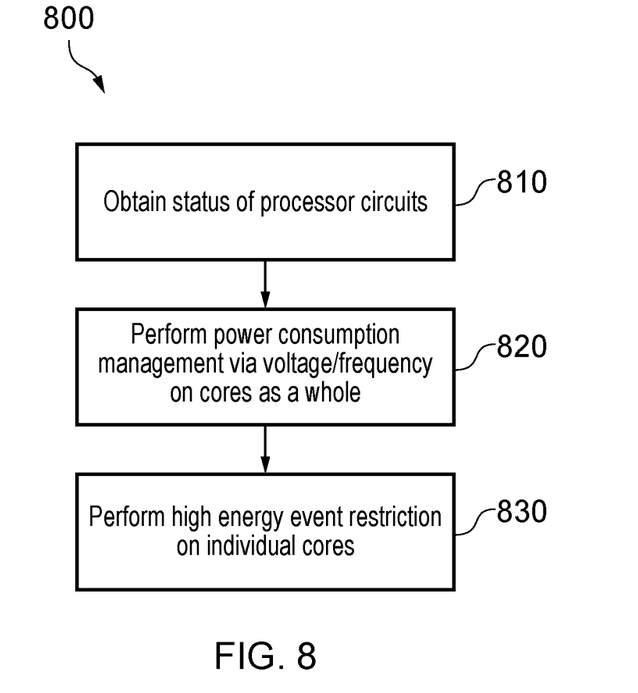
FIG. 8 shows a flowchart in accordance with some embodiments.

FIG. 8 illustrates a process of data processing in accordance with some examples in the form of a flowchart 800. At a step 810, a status of the processor circuits is obtained. This could occur, for instance, via the counters 140. At a step 820, power consumption management with respect to the voltage/frequency is performed on the cores as a whole. Then, at step 830, high energy event restriction is performed on individual cores. The selected high energy event restriction for each core, and the selected voltage/frequency for all cores (as a whole) is selected from one of the configuration tuples. It will be appreciated that in some embodiments, some of these steps might be completed in a different order. For instance once the configuration tuple has been selected, if the frequency/voltage is to be increased then the restriction of HEEs is first increased. Alternatively, if the frequency/voltage is to be decreased then this occurs before the HEE restriction is decreased.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing apparatus comprising:
a plurality of processor circuits to process an event stream comprising one or more high energy events, wherein each of the plurality of processor circuits is configured to draw power from a same power rail;
power management circuitry to perform power consumption management by controlling a voltage supply to the power rail, and a frequency of a clock signal provided to the plurality of processor circuits;
status analysis circuitry to obtain a status of the individual processing load of each of the processor circuits; and
restriction circuitry to perform high energy event restriction on each of the plurality of processor circuits, wherein
the power consumption management and the high energy event restriction are both based on the individual processing load of each of the plurality of processor circuits; and
each of the processor circuits is restrictable by the restriction circuitry independently of others of the processor circuits.

2. The data processing apparatus according to claim 1, wherein
the power management circuitry is incapable of supplying both a maximum requested voltage supply and a maximum requested clock signal to all of the plurality of processor circuits simultaneously in the absence of the high energy event restriction.

3. The data processing apparatus according to claim 1, wherein
a distribution of the high energy events is unequal across the plurality of processor circuits; and
the status of the individual processing load of each of the plurality of processor circuits comprises the distribution of the high energy events across the plurality of processor circuits.

4. The data processing apparatus according to claim 1, wherein
at least one of the status analysis circuitry and the restriction circuitry is configured to reassess at least one of the voltage supply, the frequency of the clock signal, and the high energy event restriction each period; and
during the period, one of the plurality of processor circuits receives more of the high energy events than all others of the plurality of processor circuits combined.

5. The data processing apparatus according to claim 1, comprising:

storage circuitry to store a plurality of configuration tuples, wherein each configuration tuple comprises a specified frequency, a specified voltage, and a specified restriction amount, wherein the power management circuitry is configured to select the specified frequency from one of the configuration tuples as the frequency of the clock signal, and to select the specified voltage from the one of the configuration tuples as the voltage supply to the power rail; and the restriction circuitry is configured to select the specified restriction amount from the one of the configuration tuples as the amount of the high energy event restriction to be performed.

6. The data processing apparatus according to claim 5, wherein the specified restriction amount indicates an extent to which restriction of the high energy events occurs for each of the processor circuits individually.

7. The data processing apparatus according to claim 6, wherein each combination of possible restriction amounts for the processor circuits is provided at most once in the storage circuitry.

8. The data processing apparatus according to claim 6, wherein a number of the configuration tuples stored in the storage circuitry corresponds with a number of possible frequencies at which the processor circuits can operate.

9. The data processing apparatus according to claim 1, wherein the high energy event restriction for each processor circuit is initially determined based on a count of the high energy events on that processor circuit.

10. The data processing apparatus according to claim 9, wherein the high energy event restriction for each processor circuit is modified according to a request from a management system for that processor circuit.

11. The data processing apparatus according to claim 10, wherein the request is for an increase in the frequency of the clock signal.

12. The data processing apparatus according to claim 10, wherein in response to the request being a request for an increase in the frequency of the clock signal when a further condition is met, the frequency of the clock signal is reduced.

13. The data processing apparatus according to claim 12, wherein the further condition is that the request is received from a highest high energy event loaded processor circuit in the processor circuits.

14. The data processing apparatus according to claim 9, wherein the voltage supply to be supplied to the power rail and the frequency of the clock signal provided to the plurality of processor circuits is determined based on the high energy event restriction for each processor circuit.

15. The data processing apparatus according to claim 1, wherein the high energy event stream comprises a high energy instruction stream; and the one or more high energy events comprises one or more high energy instructions.

16. The data processing apparatus according to claim 4, wherein the one or more high energy events consume more power than an average power consumption of other events in the event stream.

17. The data processing apparatus according to claim 4, wherein the one or more high energy events comprise a subset of instruction types.

18. The data processing apparatus according to claim 4, wherein the subset of instruction types comprises vector Instructions and precludes at least some scalar instructions.

19. A method comprising:

processing, using a plurality of processor circuits, an event stream comprising one or more high energy events, wherein each of the plurality of processor circuits is configured to draw power from a same power rail;

performing power consumption management by controlling a voltage supply to the power rail, and a frequency of a clock signal provided to the plurality of processor circuits;

obtaining a status of the individual processing load of each of the processor circuits; and performing high energy event restriction on each of the plurality of processor circuits, wherein the power consumption management and the high energy event restriction are both based on the individual processing load of each of the plurality of processor circuits; and each of the processor circuits is restrictable by the restriction circuitry independently of others of the processor circuits.

20. A data processing apparatus comprising:

means for processing, using a plurality of processor circuits, an event stream comprising one or more high energy events, wherein each of the plurality of processor circuits is configured to draw power from a same power rail;

means for performing power consumption management by controlling a voltage supply to the power rail, and a frequency of a clock signal provided to the plurality of processor circuits;

means for obtaining a status of the individual processing load of each of the processor circuits; and means for performing high energy event restriction on each of the plurality of processor circuits, wherein the power consumption management and the high energy event restriction are both based on the individual processing load of each of the plurality of processor circuits; and each of the processor circuits is restrictable by the restriction circuitry independently of others of the processor circuits.

* * * * *